US008464213B1

(12) United States Patent
Stienstra et al.

(10) Patent No.: US 8,464,213 B1
(45) Date of Patent: Jun. 11, 2013

(54) CUSTOMIZED CONTROL BUILDING

(75) Inventors: Brian Stienstra, DeBary, FL (US); Blaise Lapinski, Wylie, TX (US)

(73) Assignee: Intervoice Limited Partnership, Reno, NV (US)

( * ) Notice: Subject to any disclaimer, the term of this patent is extended or adjusted under 35 U.S.C. 154(b) by 0 days.

(21) Appl. No.: 13/459,473

(22) Filed: Apr. 30, 2012

Related U.S. Application Data

(63) Continuation of application No. 12/857,190, filed on Aug. 16, 2010, now Pat. No. 8,191,037, which is a continuation of application No. 11/361,032, filed on Feb. 23, 2006, now Pat. No. 7,802,227.

(51) Int. Cl.
*G06F 9/44* (2006.01)

(52) U.S. Cl.
USPC ............................. 717/107; 717/101; 717/105

(58) Field of Classification Search
None
See application file for complete search history.

(56) References Cited

U.S. PATENT DOCUMENTS

| 4,734,854 | A  | * | 3/1988  | Afshar .......................... 717/107 |
| 6,061,513 | A  | * | 5/2000  | Scandura ....................... 717/142 |
| 6,175,948 | B1 | * | 1/2001  | Miller et al. ................... 716/105 |
| 7,519,946 | B2 | * | 4/2009  | Celi et al. ....................... 717/109 |
| 7,665,061 | B2 | * | 2/2010  | Kothari et al. ................ 717/106 |
| 2001/0052112 | A1 | * | 12/2001 | Mohan et al. ..................... 717/1 |
| 2003/0135842 | A1 | * | 7/2003  | Frey et al. ..................... 717/121 |
| 2004/0225995 | A1 | * | 11/2004 | Marvin et al. ................ 717/100 |
| 2004/0254843 | A1 | * | 12/2004 | Koch ............................. 705/26 |
| 2005/0066304 | A1 | * | 3/2005  | Tattrie et al. .................. 717/101 |
| 2005/0235247 | A1 | * | 10/2005 | Francis et al. ................ 717/100 |
| 2006/0015844 | A1 | * | 1/2006  | Johnson et al. ............... 717/106 |
| 2006/0101442 | A1 | * | 5/2006  | Baumgart et al. ............ 717/162 |
| 2006/0236304 | A1 | * | 10/2006 | Luo et al. ...................... 717/105 |

* cited by examiner

*Primary Examiner* — Emerson Puente
*Assistant Examiner* — Hiren Patel
(74) *Attorney, Agent, or Firm* — Frost Brown Todd LLC

(57) ABSTRACT

A system and method is disclosed for creating a reusable control from various applications or portions of applications. Using a pre-existing application or one specifically developed for the control, a developer programmatically declares which functionalities of the original application are to be included in the new control. This control building logic becomes a part of the application code. On execution of the application with the added control building logic, the native code that will re-create the control functionality is automatically generated. The control developer may now extend the generated code using simple Object Oriented Programming (OOP) inheritance to add properties and parameters that will control its behavior. The resulting control may then be referenced by other developers when creating a new software application.

16 Claims, 3 Drawing Sheets

CUSTOMIZED CONTROL BUILDING

CROSS REFERENCE TO RELATED APPLICATIONS

The present application claims the benefit of, and is a continuation of, U.S. non-provisional patent application Ser. No. 12/857,190, filed on Aug. 16, 2010, titled "Customized Control Building," which is a continuation of U.S. non-provisional patent application Ser. No. 11/361,032, filed on Feb. 23, 2006, titled "Customized Control Building," the disclosures of which are hereby incorporated by reference in its entirety.

TECHNICAL FIELD

The present invention relates, in general, to application development environments and, more specifically, to customized control building in computer applications.

BACKGROUND OF THE INVENTION

Early computers were programmed using machine-level language that performed rudimentary adding, subtracting, storing, and other similar basic features. While the use of machine-level language created very fast-executing applications, the amount of code required for even basic applications tended to be enormous. Moreover, machine-level language using binary code or hexadecimal code is not very intuitive for use by human to program with.

As computers advanced, high-level languages were developed that wrapped selected sequences of machine-level code into human-recognizable words for logically controlling the progress of the software application. Such abstraction makes use of interpreters, compilers, translators that process the high-level code into machine-executable object code. This concept of abstraction and wrapping has also been extended into high-level programming. Most high-level languages allow for user-created functions, in which the user writes a block of code that represents the function and can call that functional code by referring to the function name in the main section of the program logic. Functions typically perform a designated task that is called during the execution of a particular program.

The concept of abstraction or wrapping comes from Object Oriented Programming (OOP). OOP is an evolutionary form of modular programming with more formal rules that allow pieces of software to be reused and interchanged between programs. The major concepts of OOP are encapsulation, inheritance, and polymorphism.

Encapsulation, i.e., abstraction or wrapping, refers to the creation of self-sufficient modules that contain the data and the processing methods that goes with the data. These modules are typically user-defined data types called classes. One instance of the class is referred to as an object. Classes are generally created in hierarchies Inheritance allows the knowledge, formatting, or processes in one class to be automatically passed down the hierarchy to other classes. This concept reduces the need for extensive programming when adding functions to existing, complex systems. Finally, polymorphism is the idea of allowing the same code to be used with different classes of data, resulting in more general and abstract implementations.

Application Development Environments (ADEs) often support OOP and employ components that are objects. ADEs are typically text-based, in which the developer enters code, graphics-based, in which the developer graphically manipulates screen objects to assemble an application, while the ADE automatically generates the underlying code to assemble the application. Using such graphics-based ADEs, developers may drag and drop components onto the development screen/area/surface in the process of designing and implementing various applications. A visual representation of the component is often displayed to the developer. The developer may then graphically manipulate the visual representation which places the objects within the application under design. Components typically have a list of properties that the developer can manipulate to affect the features and performance of the component. ADEs typically have an intermediate description of the visual representation. These intermediate descriptions will usually differ from environment to environment. The intermediate description typically identifies the type of component plus any parameters that have been changed by the developer. The parameters that are not altered by the developer usually remain at the default value.

Components often have user definable events that can be associated with scripting language or some native code which is triggered or executed when a certain event occurs inside the component. For example, a button component will typically have a ButtonPressed event that the developer can associate with some kind of logic that will execute.

Many ADEs also allow for user-created components. A component, much like an object, represents some encapsulated programmatic building block that may be used and reused throughout an application. Instead of requiring the user to rewrite the code each time the function or component is to be used, abstraction and wrappering allow for the function or component to be defined once but used many times, sometimes among many different programs, merely by referencing the name of the function or component and passing or setting parameters of the function/object. In general, the code underlying components is compiled before it is made available to the developer or is executed or interpreted at runtime depending on the type of code used. Functions are generally compiled or interpreted along with the code of the application that they are in. Functions and components may also become part of the underlying computer language. The code for these standard features is typically placed in standard or common libraries that are used either when the ADE is started for developing an application or an application is executed.

Functions and components are typically created defining properties that may be set by the developer in controlling certain aspects of the function or component, or providing the function or component with a piece of data used in performing its functionality. Some functions and components may be defined using properties that become known only on execution and only based on user input or other runtime-based information. In defining such runtime-oriented functions or components, the code for such "customization" is many times included in the source code of the application. A software company expends considerable resources in developing its software products. When code logic is exposed through the basic source code, the company's intellectual property becomes exposed to copying. Techniques have been developed to obfuscate code logic as much as possible; however, some ADEs or programming environments simply do not lend themselves to such obfuscation for some programming matters.

One difficulty faced in commercial software when code is not obfuscated, is having the software user make changes or modifications to the commercial software. Software manufacturers typically provide warranties or maintenance programs for their software. Therefore, difficulties may arise for the software manufacturers when trying to maintain software that has been modified by a third party. Moreover, the software company should not be responsible for the problems created solely because of the customer's modifications.

Creating new controls is generally reserved for programmers or developers who have significant programming experience. Typically, controls are defined or coded using lower-level languages, such as C++, SUN MICROSYSTEMS, INC.'s JAVA™, or MICROSOFT CORPORATION's C#™. Web designers who are generally used to simple, high-level HTML programming MICROSOFT CORPORATION's JSCRIPT™, NETSCAPE COMMUNICATIONS, INC.'s JAVASCRIPT™, and the like, and will not typically be familiar or possibly even competent to program such components.

BRIEF SUMMARY OF THE INVENTION

The present invention is directed to a system and method for automatically generating native language code for a control using an application created with ADE-based components and a higher level scripting language.

A developer creates an application to be wrapped into a control using the controls and scripting language supplied by the ADE. This code may be various sizes, from a simple code segment to a complete application. When the application is finished and tested, the developer, or some other party, programmatically declares which controls and script code parts of the original application logic are to be included in the new control. The developer can also programmatically create events that are executed by the new control. The developer also programmatically determines what properties of the logic may be modified by the end user of the control. This control building logic becomes a part of the application code. Because the developer uses the ADE to develop the application, he or she may have only minimal programming experience or skill and still leverage the programming tools of the ADE to produce a reasonably complex application.

On execution of the application with the added control building logic, the various embodiments of the present invention query, at runtime, each component and each script code segment specified to be included in the new control, and creates the native code that will re-create the control in its currently-running, initialized state.

This native control code is purposely generated in a manner that lends itself to extension. The control developer may now extend the generated code using simple OOP inheritance to add properties and parameters that will control its behavior. The control developer may also attach any host interaction code that existed in the original application and will be used by the new control. Host interaction code is the code that controls the interfacing between the application and the host. The resulting control may then be referenced by other developers when creating a new software application. To the extent that the control developer provided for customization, the other developers may further modify the properties on the new control to customize the behavior of the control in the developers' applications. They may also use the events executed by the new control to combine the control into the application they are designing.

The various embodiments of the present invention, thus, minimize the amount of lower-level programming used to create new controls and, therefore, may be used to transform a large application into a single, configurable control. The generated control may then be extended and changed by the developer, but he or she cannot alter the base behavior of the control. If changes are needed, the developer can alter the application with the control builder logic imbedded. Once the modified application is tested and refined, the new control code may be regenerated each time the application runs, thus, minimizing the work required for changes to the control.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
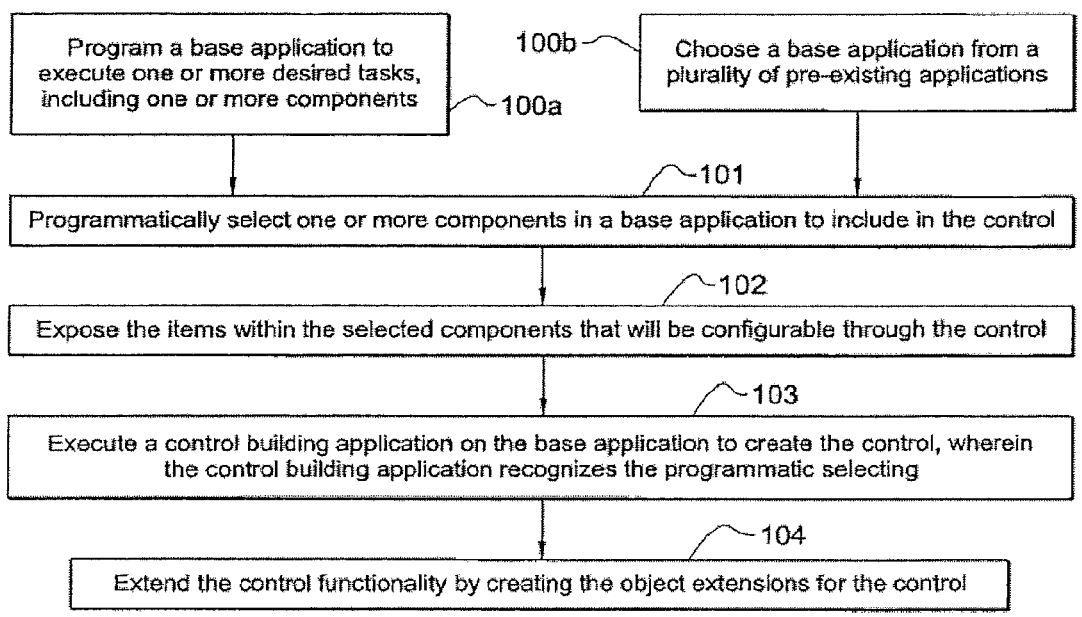
FIG. 1 is a flowchart illustrating example steps executed implementing one embodiment of the present invention.

FIG. 1 is a flowchart illustrating example steps executed implementing one embodiment of the present invention. In step 100*a*, a base application is programmed to execute one or more desired tasks, including one or more components. Alternatively, in step 100*b*, a base application can be chosen from a plurality of pre-existing applications. The control designer may code these applications in an ADE or other environment that supports coding. In step 101, one or more components in a base application are programmatically selected to include in the control. The designer may do this programmatic selection using code or script, such as C#, within the ADE. The modified base application, having the programmatically selected components, is executed, in the ADE, browser, or the like, in step 102. In response to executing the base application, the programmatic additions cause the generation of native control code for the control in step 103. The control designer may then extend the control functionality, in step 104, by creating object extensions for the native control code. Such object extensions may also be programmed using code or script such as C# or the like. Later, application developers may then incorporate the control into an application and use the object extensions to operate the control.

It should be noted that in additional and/or alternative embodiments of the present invention, directives may be added into the base application, in step 105, for executing external events responsive to the operation of the resulting control. In operation, as portions of the control functionality are executed, the directives will call the external events for execution according to the control functionality.

It should further be noted that, because the system queries runtime objects, control developers may select any type of source application to use in making controls. Such source applications may, therefore, be created using a development environment that is most familiar to the developers. Thus, the developer would not be restricted to use development environments that are connected to the final application that is intended to be ultimately created.

In implementing the control, it may be incorporated into another control or a new application. On initialization of the new control or application, the properties associated with the selected components in the control are queried. A current value for each of the properties is received and used in executing the generated code underlying the component according to how the component is included in the new control or new application. Depending on how the application developer has provided to use the control within the application or new control, the various elements or functions within the control will be implemented.

Figure 2:
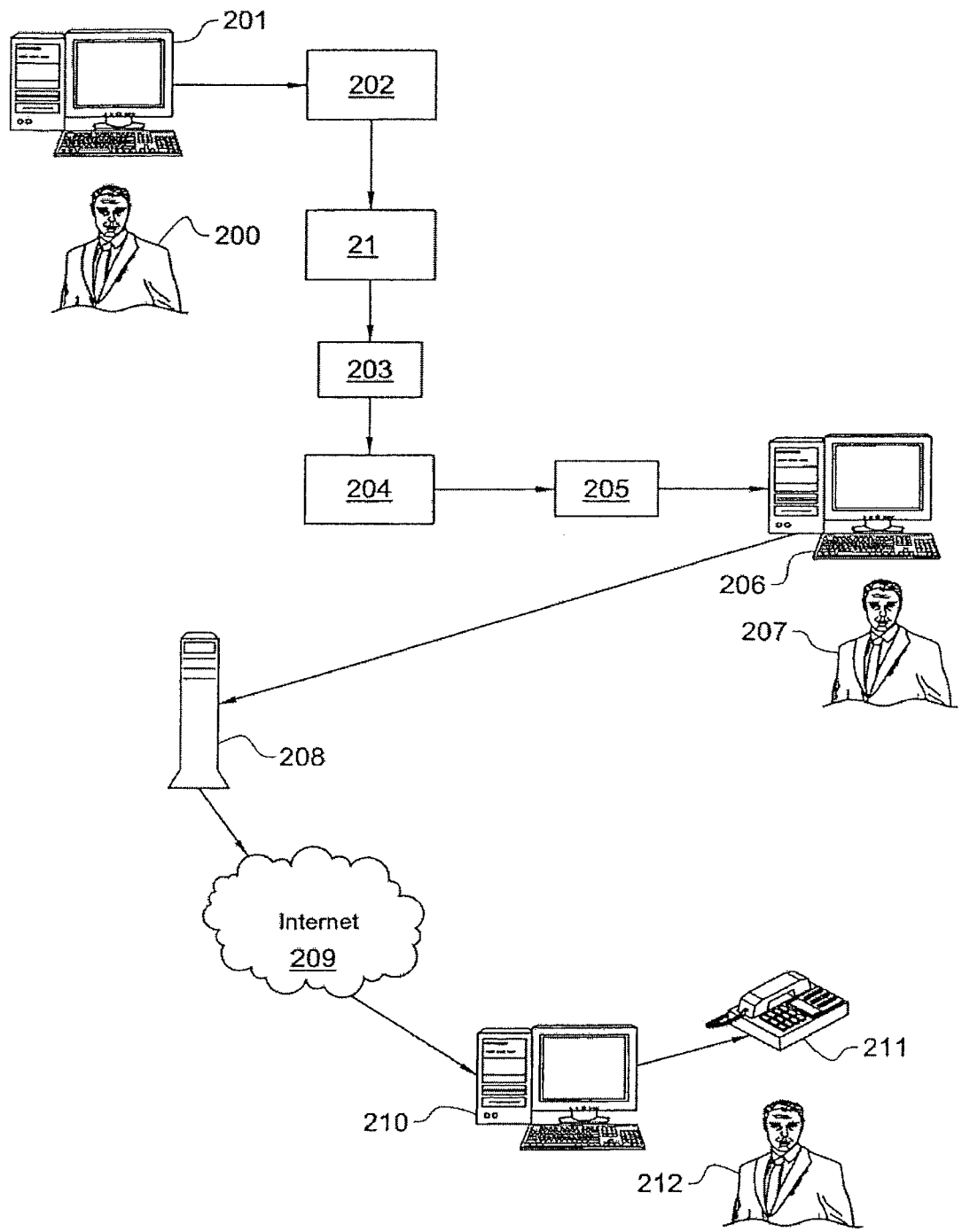
FIG. 2 is a block diagram illustrating a workflow cycle for creating a control using a control building application configured according to one embodiment of the present invention.

FIG. 2 is a block diagram illustrating workflow cycle 20 for creating control 203 using development system 201 configured according to one embodiment of the present invention. Control developer 200 uses development system 201 to develop application 202 for performing some determined functionality or functionalities. Application 202 contains various components and variables used for accomplishing this functionality Control developer 200 determines that he or she desires to turn application 202 into a control that may be used by other developers in application development.

Control developer 200 enters control code directly into application 202 designating the parts of application 202 that are desired to be a part of the resulting control. Such control code may be implemented using C#™, JAVA™, or the like. Once application 202 has been modified with the specific control code, it is executed in development environment 201. Control code interpreter 21 is used by development environment 201 to recognize the control code within application 202 and wraps the selected portions into a resulting, single control, control 203. The execution of application 202 in development environment 201 causes native control code to be generated that supports the functionality of control 203.

It should be noted that various parts of application 202 may be selected by control developer 200. Control developer 200 designates and/or exposes selected components, commands, any events that are either consumed or produced, variables or properties that are changeable through the control, and any other parts of application 202 that may be executable and/or varied by control 203. Control developer 200 also develops the object extensions for control 203 that are used by other application developers to extend the functionality of control 203 into the new application.

Specific application technologies may also provide technology-specific elements that may be designated for use in control 203. For example, in voice applications, semantics are the information retrieved from a caller's responses. Control 203 may designate and define internal and external semantic items and the voice prompts to be used by the components. In operation, the system plays a prompt to a caller; the caller makes a verbal response to the prompt; and, the system captures the audio response of the caller. Grammars are the set of rules that voice recognition technology uses to parse through the audio of the caller responses and interpret those audio signals into recognizable information. The rules in the various grammars used by the speech recognition system are also used to return the necessary information for the application. This information is placed in semantic items that are used when necessary in the application. The control user supplies external semantic items while internal items are retrieved by the control and not exposed to the control user.

Control 203 is stored in location 204, which may be a storage medium, a database, a linked library, or the like. Location 204 simply provides a location that a control user may access control 203. Application developer 207 develops application 205 on computer 206. Part of the functionality offered by application 205 includes features that are implemented within control 203. Application developer 207 incorporates the desired features by referring to control 203 within application 205. Instead of coding all of the logic to implement the features within control 203, mere reference to control 203 along with setting its properties are sufficient. Application developer 207 refers to control 203 within application 205 and programs any logic that may be used by application 205 to obtain variables for control 203 or to execute any of the desired features or capabilities exposed to the user for configuring the specific execution of control 203. The resulting version of application 205, therefore, contains the capabilities of the programming logic of the selected parts of application 202 without exposing the source code of application 202 to the public.

When application 205 is made publicly available, it is placed onto server 208. Server 208 may be any number of various server types, such as a speech server, a Web server, a network server, or the like. Users, such as user 212, may access and execute application 205 using any number of various access methods, including computer 210, telephone 211, and the like. In one method of access, user 212 executes application 205 by making a request from computer 210 over Internet 209. Such a request may be made in any number of electronic formats and/or protocols, such as Hypertext Transfer Protocol (HTTP). On startup of application 205, the embedded instances of control 203 query the properties of the various functions, components, variables, and the like in order to obtain the current state of each of those features. Once these variables and/or properties have been set, the interface is rendered and communicated to the display on computer 210. User 212 may then interact with the interface of application 205 and provide necessary data or responses for further processing by application 205. As indicated above, some of the data provided by user 212 may further be used to process some of the functionality embedded within control 203. New interface units are generated using this information and sent to the display on computer 210.

The program or code segments making up the various embodiments of the present invention may be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, and the like. The computer data signal may include any signal that can propagate over a transmission medium such as electronic network channels, optical fibers, air, electromagnetic, RF links, and the like. The code segments may be downloaded via computer networks such as the Internet, Intranet, and the like.

Figure 3:
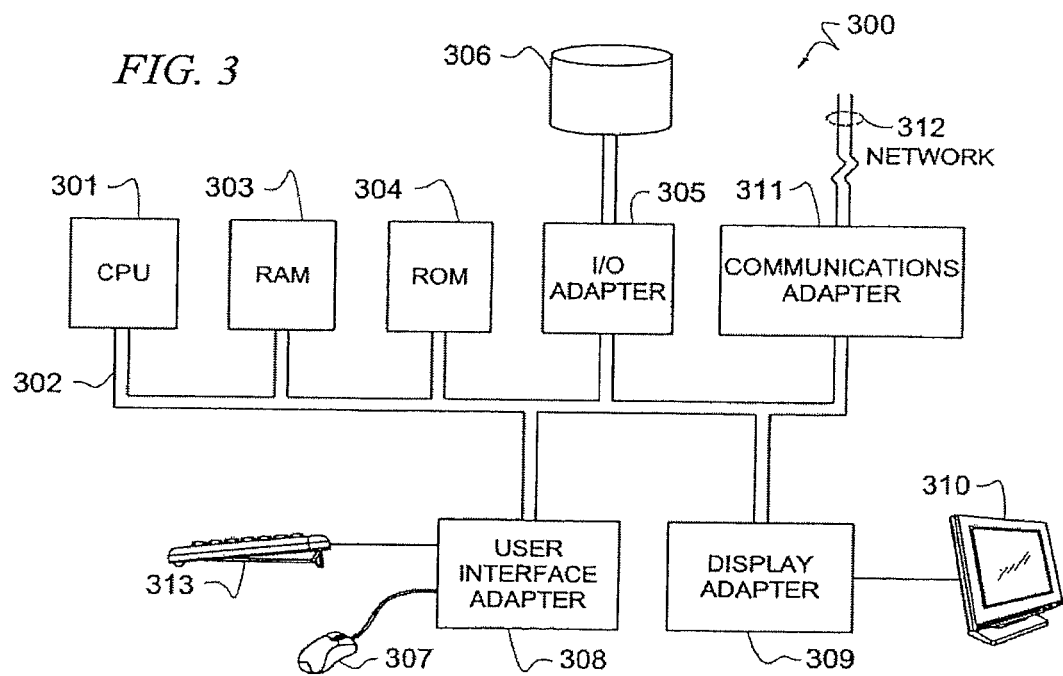
FIG. 3 illustrates a computer system adapted to use embodiments of the present invention.

FIG. 3 illustrates computer system 300 adapted to use embodiments of the present invention, e.g. storing and/or executing software associated with the embodiments. Central processing unit (CPU) 301 is coupled to system bus 302. The CPU 301 may be any general purpose CPU. However, embodiments of the present invention are not restricted by the architecture of CPU 301 as long as CPU 301 supports the inventive operations as described herein. Bus 302 is coupled to random access memory (RAM) 303, which may be SRAM, DRAM, or SDRAM. ROM 304 is also coupled to bus 302, which may be PROM, EPROM, or EEPROM. RAM 303 and ROM 304 hold user and system data and programs as is well known in the art.

Bus 302 is also coupled to input/output (I/O) controller card 305, communications adapter card 311, user interface card 308, and display card 309. The I/O adapter card 305 connects storage devices 306, such as one or more of a hard drive, a CD drive, a floppy disk drive, a tape drive, to computer system 300. The I/O adapter 305 is also connected to a printer (not shown), which would allow the system to print paper copies of information such as documents, photographs, articles, and the like. Note that the printer may be a printer (e.g., dot matrix, laser, and the like), a fax machine, scanner, or a copier machine. Communications card 311 is adapted to couple the computer system 300 to a network 312, which may be one or more of a telephone network, a local (LAN) and/or a wide-area (WAN) network, an Ethernet network, and/or the Internet network. User interface card 308 couples user input devices, such as keyboard 313, pointing device 307, and the like, to the computer system 300. The display card 309 is driven by CPU 301 to control the display on display device 310.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for creating a control in an application development environment (ADE) comprising:
    a. programmatically selecting one or more components in a source application to include in said control, wherein the source application comprises one or more comments desired to include in said control;
    b. executing said source application, wherein said ADE recognizes said programmatic selecting to create said control;
    c. responsive to said execution, automatically generating native code by said ADE defining one or more functionalities of said selected one or more components in said control;
    d. creating one or more object extensions by said ADE to expose said one or more functionalities in said control to an application developer; and
    e. wherein programmatically selecting one or more components in a source application to include in said control comprises:
        i. inserting control selection code designating said one or more components;
        ii. setting one or more events in said source application that said control communicates with a programming environment; and
        iii. identifying in said source application one or more variable properties variable in said control.

2. The method of claim 1 further comprising receiving code instructions from said application developer, wherein said code instructions expose in said source application the one or more variable properties variable in said control.

3. The method of claim 2 wherein said source application is a voice application and wherein said one or more variable properties comprises one or more voice prompts used in said voice application.

4. The method of claim 1 further comprising referencing select ones of said one or more object extensions to incorporate select ones of said one or more functionalities of said control into a new application.

5. The method of claim 4 further comprising:
    a. querying one or more properties associated with said selected one or more components, responsive to initiation of said new application; and
    b. receiving a current value for each of said one or more properties.

6. The method of claim 1 further comprising receiving input from said application developer to program said source application to execute one or more desired tasks, including said one or more components.

7. The method of claim 1 further comprising, via reference to said control, programming logic usable by a different application to obtain variables for said control or to execute said exposed one or more functionalities.

8. A computer program product having a non-transitory computer readable storage medium with computer program logic recorded thereon for creating a computer control from a computer application, said computer program product comprising:
    a. code for programmatically selecting one or more components in a source application to include in said control, wherein said programmatic selection is based on:
        i. the insertion of control selection code into said source application designating the one or more components,
        ii. said source application being coded with of one or more comments desired to include in said control,
        iii. said source application being set with one or more events that said control communicates with a programming environment, and
        iv. the identification in said source application of one or more variable properties variable in said control;
    b. code for executing said source application, wherein said ADE recognizes said programmatic selecting to create said control;
    c. code for, responsive to said execution, automatically generating native code by said ADE defining one or more functionalities of said selected one or more components in said control; and
    d. code for creating one or more object extensions by said ADE to expose said one or more functionalities in said control to an application developer.

9. The computer program product of claim 8 further comprising code for receiving code instructions from said application developer, wherein said code instructions expose in said source application the one or more variable properties variable in said control.

10. The computer program product of claim 9 wherein said source application is a voice application and wherein said one or more variable properties comprises one or more voice prompts used in said voice application.

11. The computer program product of claim 8 further comprising code for referencing select ones of said one or more object extensions to incorporate select ones of said one or more functionalities of said control into a new application.

12. The computer program product of claim 11 further comprising code for:
   a. querying one or more properties associated with said selected one or more components, responsive to initiation of said new application; and
   b. receiving a current value for each of said one or more properties.

13. The computer program product of claim 8 further comprising code for receiving input from said application developer to program said source application to execute one or more desired tasks, including said one or more components.

14. The computer program product of claim 8 further comprising, via reference to said control, code for programming logic usable by a different application to obtain variables for said control or to execute said exposed one or more functionalities.

15. The computer program product of claim 14 further comprising code for storing the different application on a server, wherein the server comprises a speech server, a Web server, or a network server.

16. The computer program product of claim 8 further comprising code for:
   a. incorporating said control into a different application, and
   b. using the object extensions to operate said control.

* * * * *